(12) United States Patent
Kang

(10) Patent No.: US 9,122,095 B2
(45) Date of Patent: Sep. 1, 2015

(54) DISPLAY DEVICE AND LED BAR CONNECTION METHOD THEREOF

(75) Inventor: Moonshik Kang, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 582 days.

(21) Appl. No.: 13/531,154

(22) Filed: Jun. 22, 2012

(65) Prior Publication Data

US 2013/0038211 A1     Feb. 14, 2013

(30) Foreign Application Priority Data

Aug. 8, 2011    (KR) .................. 10-2011-0078679

(51) Int. Cl.
    *H01J 13/32*        (2006.01)
    *G02F 1/1335*     (2006.01)
    *H01R 12/70*      (2011.01)
    *F21V 8/00*        (2006.01)

(52) U.S. Cl.
    CPC ........ *G02F 1/133603* (2013.01); *G02B 6/0083* (2013.01); *G02B 6/0073* (2013.01); *G02F 2001/133612* (2013.01); *H01R 12/7076* (2013.01); *Y10T 29/49117* (2015.01)

(58) Field of Classification Search
    CPC ................... G02F 1/133603; G05F 1/133615
    USPC ................................. 315/113; 349/61, 65, 69
    See application file for complete search history.

(56) References Cited

U.S. PATENT DOCUMENTS

| | | | |
|---|---|---|---|
| 8,064,006 B2 * | 11/2011 | Park et al. | 349/58 |
| 8,358,387 B2 * | 1/2013 | Choi et al. | 349/65 |
| 8,416,360 B2 * | 4/2013 | Hwang et al. | 349/58 |
| 8,730,430 B2 * | 5/2014 | Naito | 349/61 |
| 8,760,603 B2 * | 6/2014 | Kweon et al. | 349/65 |

FOREIGN PATENT DOCUMENTS

| | | |
|---|---|---|
| JP | 2010-62350 A | 3/2010 |
| KR | 10-2007-0040253 A | 4/2007 |
| KR | 10-2008-0022442 A | 3/2008 |
| KR | 20-0448449 | 4/2010 |

* cited by examiner

*Primary Examiner* — Jeffrey Zweizig
(74) *Attorney, Agent, or Firm* — F. Chau & Associates, LLC

(57) ABSTRACT

Disclosed is a display device which includes a display panel, an LED bar configured to output a light to the display panel, and a source printed circuit board including a driver circuit driving the display panel and an LED driver circuit driving the LED bar, wherein the LED bar and the LED driver circuit are connected via a socket disposed at the source printed circuit board.

21 Claims, 9 Drawing Sheets

DISPLAY DEVICE AND LED BAR CONNECTION METHOD THEREOF

CROSS-REFERENCE TO RELATED APPLICATIONS

This application claims the benefits, under 35 U.S.C §119, of Korean Patent Application No. 10-2011-0078679 filed Aug. 8, 2011, the entirety of which is incorporated by reference herein.

BACKGROUND

Embodiments relate to a display device and a method of connecting an LED bar of the display device.

A display device includes a display panel unit for displaying image signals and a driver circuit unit for processing input image signals. A display panel is mounted on the display panel unit. An image processor for processing input image signals and a power supply for supplying power to the image processor and the display panel unit are mounted at the driver circuit unit.

For example, the display device includes a television that displays broadcasting signals provided from a broadcast station or image signals from a Digital Versatile Disk (DVD).

SUMMARY

An embodiment of the inventive concept provides a display device which comprises a display panel, an LED bar configured to output light to the display panel, and a source printed circuit board including a driver circuit driving the display panel and an LED driver circuit driving the LED bar, wherein the LED bar and the LED driver circuit are connected to each other via a socket disposed at the source printed circuit board.

According to an embodiment, the display panel and the source printed circuit board are electrically connected to each other via a flexible circuit board.

According to an embodiment, the display device further comprises a bottom chassis that receives the LED bar and fixes a connection between the LED bar and the LED driver circuit.

According to an embodiment, the socket includes a protruding portion penetrating the source printed circuit board and connected with the LED bar through an open portion in the bottom chassis.

According to an embodiment, the LED bar comprises an LED printed circuit board having a connection portion connected with the socket through the open portion, and at least one LED string formed on the LED bar.

According to an embodiment, the connection portion has a curve shape for smooth connection with the protruding portion of the socket at the open portion.

According to an embodiment, the LED bar has an LED string, and the LED printed circuit board has a first wire connected with an anode of the LED string and a second wire connected with a cathode of the LED string.

According to an embodiment, the LED bar has at least two LED strings, and the LED printed circuit board has a first wires connected with anodes of the LED strings and second wires respectively connected with cathodes of the LED strings.

According to an embodiment, the LED bar has an LED string, the LED printed circuit board has a first wire connected with an anode of the LED string, and a cathode of the LED string is grounded via the bottom chassis.

According to an embodiment, the LED bar has at least two LED strings, the LED printed circuit board has first wires respectively connected with anodes of the LED strings, and cathodes of the LED strings are grounded via the bottom chassis.

According to an embodiment, the open portion of the bottom chassis is sealed when the LED bar is connected to the socket.

According to an embodiment, the display device further comprises a heat sink connected with a backside of the LED bar. The heat sink removes a heat generated by the LED bar.

According to an embodiment, the display device further comprises a light guide plate at a side of the LED bar, wherein the light guide plate guides light output from the LED bar to the display panel, and a top chassis surrounding the display panel and connected with the bottom chassis.

An embodiment of the inventive concept provides a display device which comprises a display panel, first and second LED bars configured to output light to the display panel, and a source printed circuit board including a driver circuit driving the display panel and first and second LED driver circuits driving the first and second LED bars, respectively, wherein the first and second LED bars are respectively connected with the first and second LED driver circuits via first and second sockets disposed at the source printed circuit board.

According to an embodiment, the first and second LED bars are opposite to each other and are disposed at corners of the source printed circuit board.

According to an embodiment, the first and second sockets are adjacent to the first and second LED driver circuits, respectively.

According to an embodiment, the display device further comprises a top chassis surrounding the display panel, and a bottom chassis connected to the top chassis, wherein the bottom chassis receives the first and second LED bars and fixes connections between the first and second sockets and the first and second LED bars.

According to an embodiment, each of the first and second sockets comprises first and second protrusions connected with an LED bar at an open portion of the bottom chassis, and the first protrusion is fixed at a side portion of the open portion, the second protrusion is fixed at another side portion of the open portion, and the LED bar is connected to the socket between the first and second protrusions.

According to an embodiment, each of the first and second LED bars includes a cathode grounded by the bottom chassis.

An embodiment of the inventive concept provides an LED bar connecting method of a display device. The LED bar connecting method comprises fabricating at least one LED driver circuit driving at least one LED bar, a socket connected with the LED driver circuit, and a source printed circuit board having a driver circuit driving a display panel, and connecting the at least one LED bar to the source printed circuit board via the socket, wherein the at least one LED bar includes a cathode grounded by a chassis of the display device.

BRIEF DESCRIPTION OF THE FIGURES

The embodiments will become apparent from the following description with reference to the following figures, wherein.

DETAILED DESCRIPTION

Figure 1:
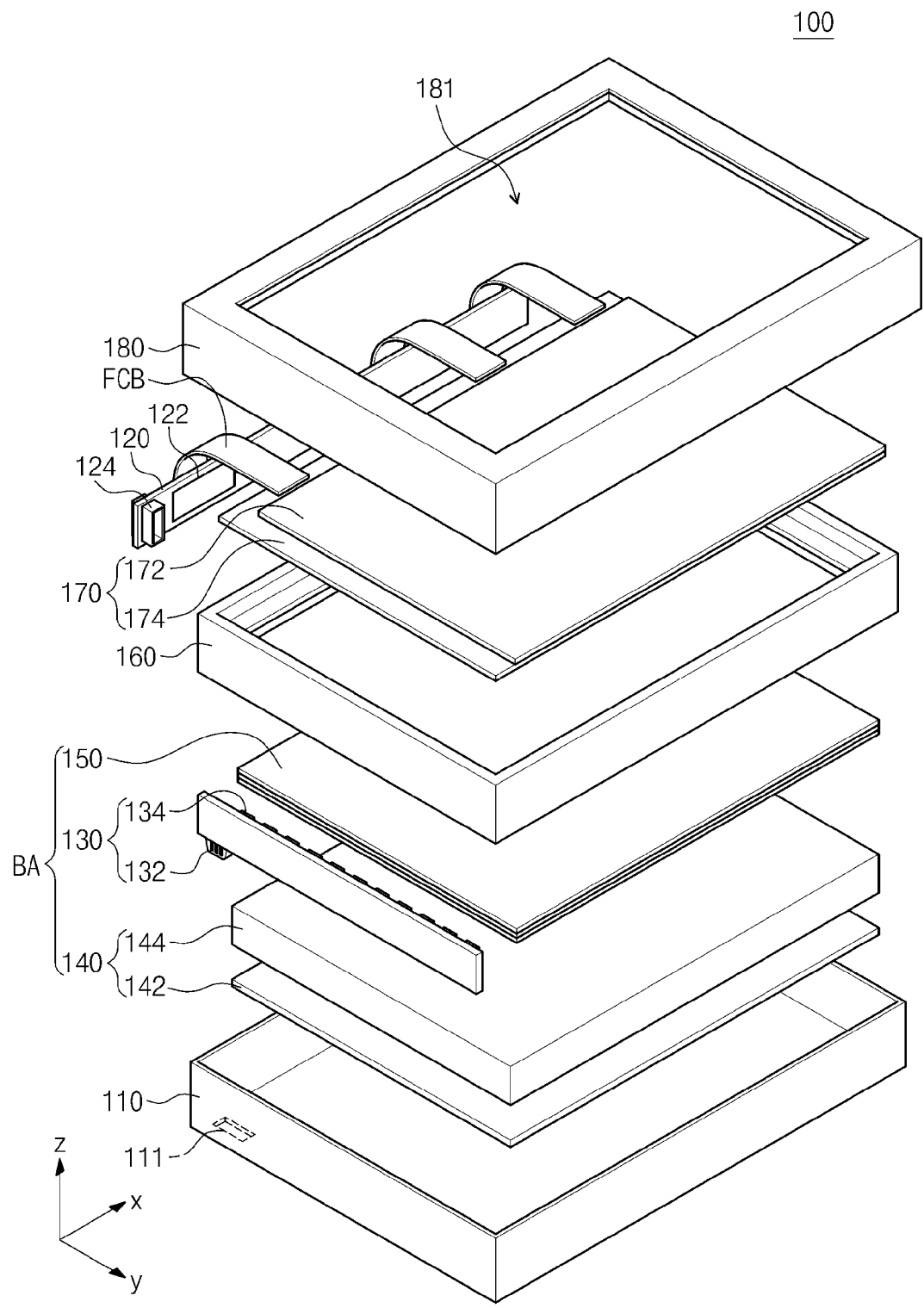
FIG. 1 is an exploded perspective view of a display device according to an embodiment of the inventive concept.

The embodiments of the inventive concept are described more fully hereinafter with reference to the accompanying drawings. In the drawings, the size and relative sizes of layers and regions may be exaggerated for clarity. Like numbers may refer to like or similar elements throughout the drawings and the specification.

It will be understood that when an element or layer is referred to as being "on", "connected to", "coupled to", or "adjacent to" another element or layer, it can be directly on, connected, coupled, or adjacent to the other element or layer, or intervening elements or layers may be present.

FIG. 1 is an exploded perspective view of a display device according to an embodiment of the inventive concept. Referring to FIG. 1, a display device includes a bottom chassis 110, a source printed circuit board 120, a Light Emitting Diode (LED) bar 130, a light guide unit 140, optical sheets 150, a mold frame 160, a display panel 170, and a top chassis 180. The LED bar 130, the light guide unit 140, and the optical sheets 150 are included in a backlight assembly BA which provides light to the display panel 170.

The bottom chassis 110 is placed at a bottom of the backlight assembly BA and receives the backlight assembly BA. The bottom chassis 110 includes a bottom part, which is parallel with a lower part of a reflection sheet 142 and a rear surface of the reflection sheet 142, and a sidewall part extended upward from the bottom part. The backlight assembly BA is stored in a space formed by the bottom part and the sidewall part.

The bottom chassis 110 has an open portion 111 where the source printed circuit board 120 and the LED bar 130 are connected to each other. The open portion 111 is placed at a bottom portion of the bottom chassis 110.

The source printed circuit board 120 is electrically connected with the display panel 170 via a Flexible Circuit Board (FCB), and includes a driver circuit (not shown) driving the display panel 170, an LED driver circuit 122 driving the LED bar 130, and a socket 124 electrically connected to the LED driver circuit 122 and the LED bar 130.

The socket 124 is disposed at the source printed circuit board 120, and is a connector used to electrically connect the LED driver circuit 122 and the LED bar 130. According to an embodiment, the socket 124 is disposed adjacent to the LED driver circuit 122. According to an embodiment, at least one socket 124 is provided.

The LED bar 130 is disposed at a side of the bottom chassis 110 upon assembly. The LED bar 130 includes at least one LED string outputting light. The LED bar 130 has a structure which can be connected to the socket 124 of the source printed circuit board 120. According to an embodiment, the LED bar 130 has a structure in which an LED is placed at one vertical edge.

The light guide unit 140 receives light from the LED bar 130 and outputs the received light to the display panel 170. The light guide unit 140 includes the reflection sheet 142 and a light guide plate 144. The reflection sheet 142 changes a propagation direction of incident light. The light guide plate 144 has a plate shape of a rectangular parallelepiped, and is disposed at a lower part of the display panel 170. The wider two surfaces of the light guide plate 144, which are opposite to each other are disposed in parallel with the display panel 170. The light guide plate 144 guides light to the display panel 170. Although not shown, the light guide plate 144 includes a first surface (also referred to as a light input surface) through which light is incident and a second surface (also referred to as a light output surface) through which light is output. The first surface is opposite to the LED bar 130, and the second surface is opposite to the display panel 170. Light incident into the light guide plate 144 is output to the display panel 170 (in a Z direction) via the second surface (or light output surface).

The optical sheets 150 are disposed between the light guide unit 140 and the display panel 170. Although not shown, the optical sheets 150 include at least one prism sheet for improving a front brightness by concentrating light output from the light guide unit 140 and at least one diffusion sheet for diffusing light.

The mold frame 160 is provided along an edge of the display panel 170 and supports the display panel 170 at a lower part of the display panel 170. The mold frame 160 has a square ring shape. It is illustrated that the mold frame 160 is formed of one mold frame. However, the embodiments of the inventive concept are not limited thereto.

The display panel 170 displays images. According to an embodiment, as a non-emissive display panel, the display panel 170 includes various display panels, such as a liquid crystal display panel or an electrophoretic display panel. For purposes of illustration, the display panel 170 is a liquid crystal display panel.

The display panel 170 has a square plate shape having a long/horizontal edge (an X direction) and a short/vertical edge (a Y direction). The display panel 170 includes a first substrate 172, a second substrate 174 opposite to the first substrate 172, and a liquid crystal layer (not shown) formed between the first substrate 172 and the second substrate 174. According to an embodiment, the first substrate 172 includes a plurality of pixel electrodes (not shown) and a plurality of thin film transistors (not shown) electrically connected with the plurality of pixel electrodes, respectively. Each thin film transistor switches a driving signal provided to a corresponding pixel electrode. The second substrate 174 includes a common electrode (not shown) which makes electric fields together with the pixel electrodes, thus controlling arrangement of liquid crystal molecules The top chassis 180 is placed at a top of the display panel 170. The top chassis 180 supports a front edge of the display panel 170 and covers a side of the top chassis 180 or a side of the bottom chassis 110. The top chassis 180 includes a display window 181 that exposes a display region of the display panel 170.

Since a conventional display device uses wires to connect an LED bar and an LED driver circuit, assembly is complicated and consumes many man-hours. Further, damage to the wires may cause lighting defects.

The display device 100, according to an embodiment of the inventive concept, is implemented such that the LED driver circuit 122 and the LED bar 130 are directly connected to each other via the socket 124. Accordingly, it is possible to simplify assembly and to reduce man-hours.

Figure 2:
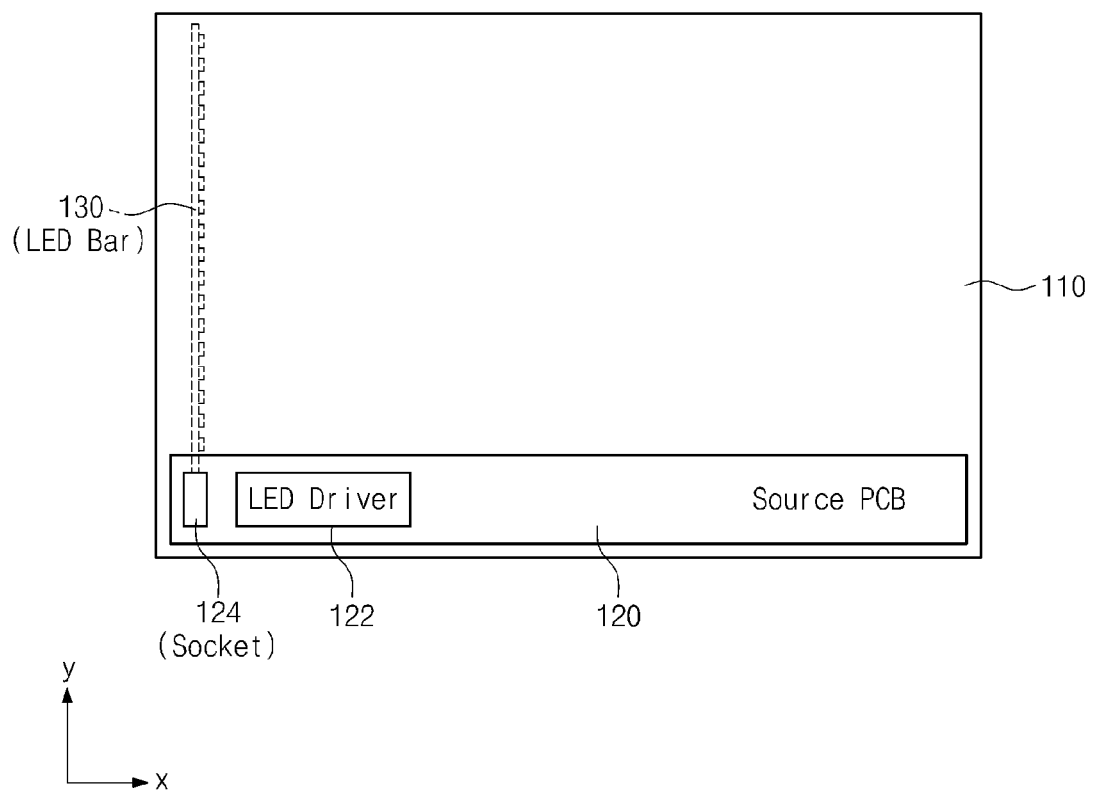
FIG. 2 is a diagram schematically illustrating a backside of a bottom chassis of a display device as shown in FIG. 1.

FIG. 2 is a diagram schematically illustrating a backside of a bottom chassis of a display device as shown in FIG. 1. Referring to FIG. 2, a source printed circuit board 120 is connected with an LED bar 130 via a socket 124. The socket 124 is disposed adjacent to an LED driver circuit 122.

Figure 3:
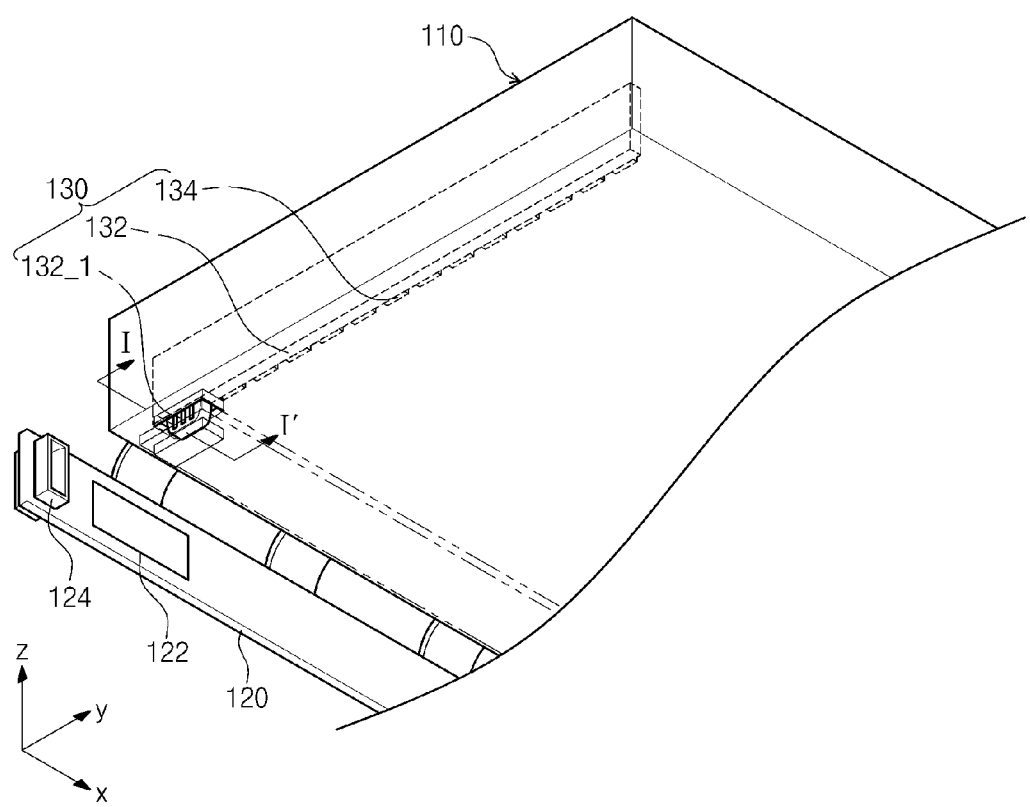
FIG. 3 is a diagram schematically illustrating a connection relation of an LED bar 130 of a display device according to an embodiment of the inventive concept.

FIG. 3 is a diagram schematically illustrating a connection relation of an LED bar 130 of a display device according to an embodiment of the inventive concept. Referring to FIG. 3, a socket 124 and an LED bar printed circuit board 132 are connected to each other.

The socket 124 penetrates a source printed circuit board 120. The socket 124 is connected to an open portion 111 of a bottom chassis 110. The socket 124 and the LED bar printed circuit board 132 are electrically connected to each other through the open portion 111.

According to an embodiment, the open portion 111 of the bottom chassis 110 is sealed by connection with the socket 124.

According to an embodiment, the open portion 111 of the bottom chassis 110 and a connection part 132_1 of the LED bar 130 are disposed near where an LED driver circuit 122 is placed at the source printed circuit board 120.

The connection part 132_1 of the LED bar 130 according to an embodiment of the inventive concept connects the socket 124 and the LED bar printed circuit board 132.

Figure 4:
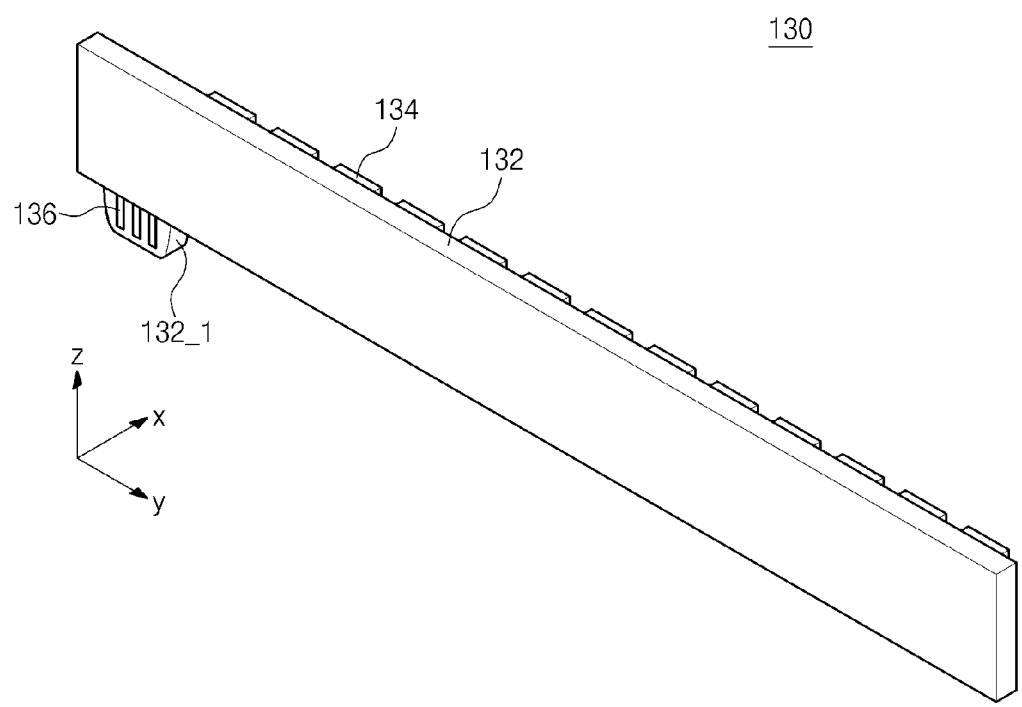
FIG. 4 is a diagram schematically illustrating an LED bar as shown in FIG. 3.

FIG. 4 is a diagram schematically illustrating an LED bar as shown in FIG. 3. Referring to FIG. 4, an LED bar 130 includes an LED bar printed circuit board 132 and at least one LED string 134.

The LED bar printed circuit board 132 includes a connection part 132_1 which is protruded upward from the LED bar 130. According to an embodiment, the connection part 132_1 has a curved shape.

The connection part 132_1 of the LED bar printed circuit board 132 includes at least one wire 136. The wire 136 is connected with an anode or a cathode of the at least one LED string 134. The number of the wire(s) 136 corresponds to the number of the LED string(s) 134 included in the LED bar 130.

As illustrated in FIG. 4, since the LED bar printed circuit board 132 has a curved shape, it is possible to easily assemble a socket 124 as shown in FIG. 3 and the LED bar 130.

Figure 5:
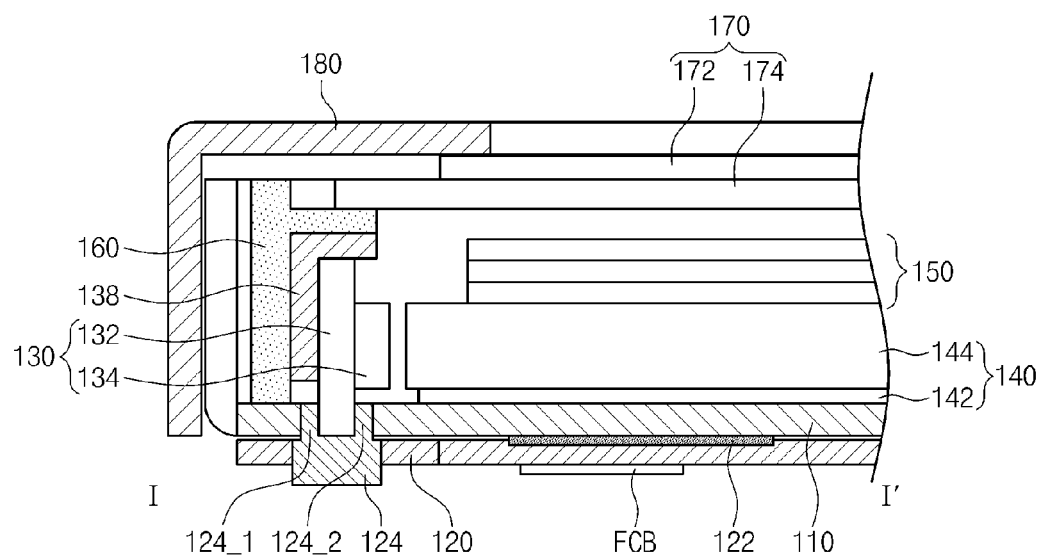
FIG. 5 is a cross section view taken along a line I-I' in FIG. 3 and showing an assembled state of the display device of FIG. 1.

FIG. 5 is a cross section view taken along a line I-I' in FIG. 3, wherein the socket 124 and the connection part 132_1 of the LED bar 130 are connected to each other through the open portion 111. FIG. 5 also includes the components of the display device shown in FIG. 1 in an assembled state. In FIG. 5, an assembled display device is illustrated as an example. Referring to FIG. 5, a socket 124 penetrates a source printed circuit board 120 and protrudes into a bottom chassis direction.

The socket 124 includes a first protrusion 124_1 and a second protrusion 124_2. The first protrusion 124_1 is connected to a left portion of a bottom chassis 110, and the second protrusion 124_2 is connected to a right portion of the bottom chassis 110. The first protrusion 124_1 is spaced apart from the second protrusion 124_2.

An LED bar printed circuit board 132 is connected to the socket 124 between the first protrusion 124_1 and the second protrusion 124_2. An LED string 134 is formed on the LED bar printed circuit board 132.

A heat sink 138 surrounds part of the LED bar printed circuit board 132 and removes heat generated by the LED bar 130. According to an embodiment, the heat sink 138 is formed of aluminum.

According to an exemplary embodiment of the inventive concept, it is possible to prevent dust from flowing into the LED bar 130 since the socket 124 is sealed when the socket 124 is connected with the LED bar 130.

FIGS. 6 through 9 are diagrams schematically illustrating LED bars according to embodiments of the inventive concept.

Figure 6:
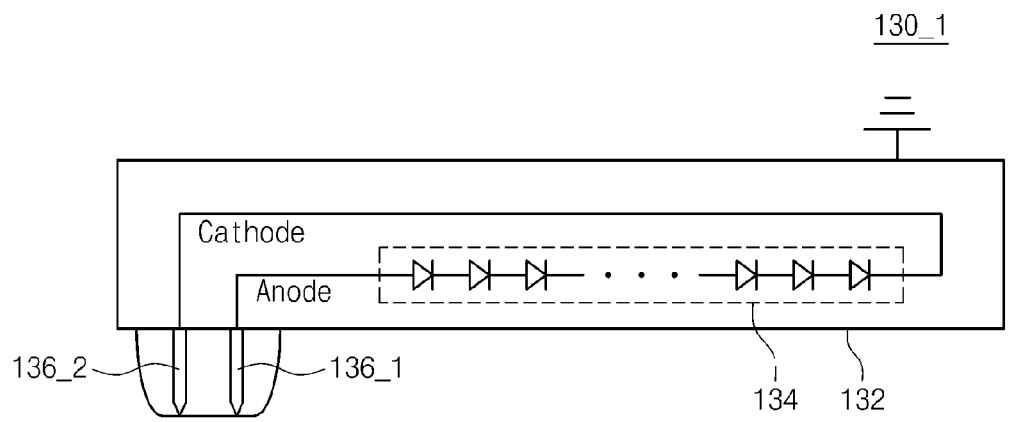
FIG. 6 is a diagram schematically illustrating an LED bar according to an embodiment of the inventive concept.

FIG. 6 is a diagram schematically illustrating an LED bar according to an embodiment of the inventive concept. Referring to FIG. 6, an LED bar 130_1 includes an LED string 134 formed on an LED bar printed circuit board 132. The LED bar printed circuit board 132 includes first and second wires 136_1 and 136_2. The first wire 136_1 is connected to an anode of the LED string 134, and the second wire 136_2 is connected to a cathode of the LED string 134.

The LED bar 130 in FIG. 6 includes one LED string. However, the embodiments of the inventive concept are not limited thereto. For example, according to an embodiment, the LED bar 130 includes a plurality of LED strings.

Figure 7:
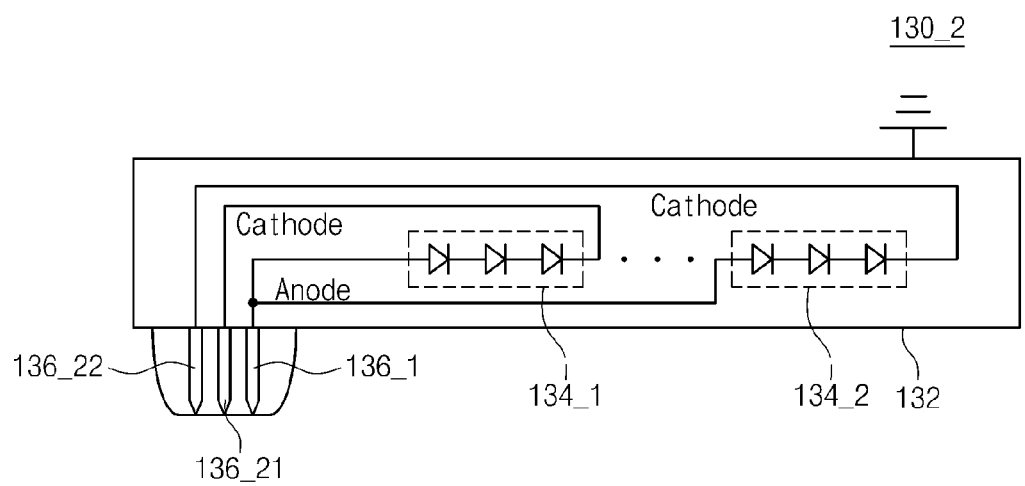
FIG. 7 is a diagram schematically illustrating an LED bar according to an embodiment of the inventive concept.

FIG. 7 is a diagram schematically illustrating an LED bar according to an embodiment of the inventive concept. Referring to FIG. 7, an LED bar 130_2 includes two LED strings 134_1 and 134_2 formed on an LED bar printed circuit board 132. In FIG. 7, two LED strings 134_1 and 134_2 are illustrated. However, the embodiments of the inventive concept are not limited thereto. For example, according to an embodiment, the LED bar 130_2 includes at least two LED strings. For purposes of illustration, the LED bar 130_2 includes two LED strings.

The LED bar printed circuit board 132 includes first, second, and third wires 136_1, 136_21, and 136_22. The first wire 136_1 is connected to an anode shared by the first and second LED strings 134_1 and 134_2, the second wire 136_21 is connected to a cathode of the first LED string 134_1, and the third wire 136_22 is connected to a cathode of the second LED string 134_2.

An LED bar according to an embodiment of the inventive concept has a cathode grounded by the bottom chassis.

Figure 8:
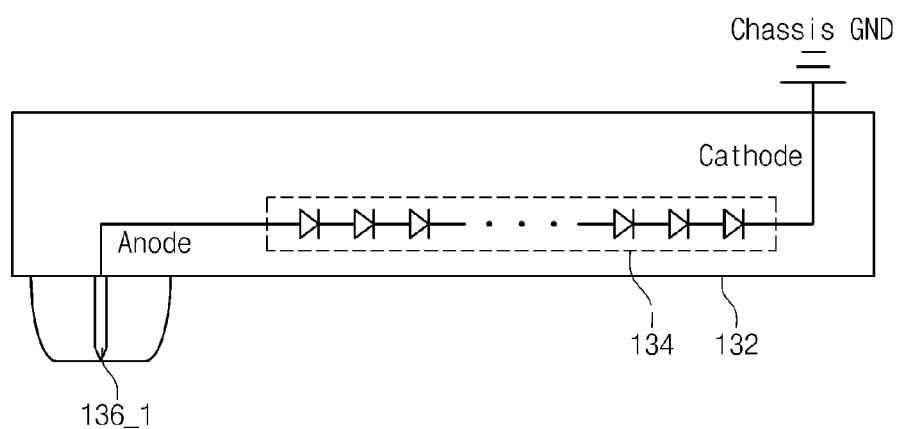
FIG. 8 is a diagram schematically illustrating an LED bar according to an embodiment of the inventive concept.

FIG. 8 is a diagram schematically illustrating an LED bar according to an embodiment of the inventive concept. Referring to FIG. 8, an LED bar 130_3 includes an LED string 134 which is formed on an LED bar printed circuit board 132 and has a cathode grounded by the bottom chassis. The LED bar printed circuit board 132 includes a first wire 136_1, which is connected to an anode of the LED string 134.

As compared with an LED bar as illustrated in FIG. 6, the LED bar 130_3 is implemented such that the number of wires is reduced to one at the LED bar printed circuit board 132 connected with a socket 124 as illustrated in FIG. 1.

The LED bar printed circuit board 132 is connected to a bottom chassis and grounded by the bottom chassis. The bottom chassis 110 and the LED bar printed circuit board 132 are connected to each other using a screw.

Figure 9:
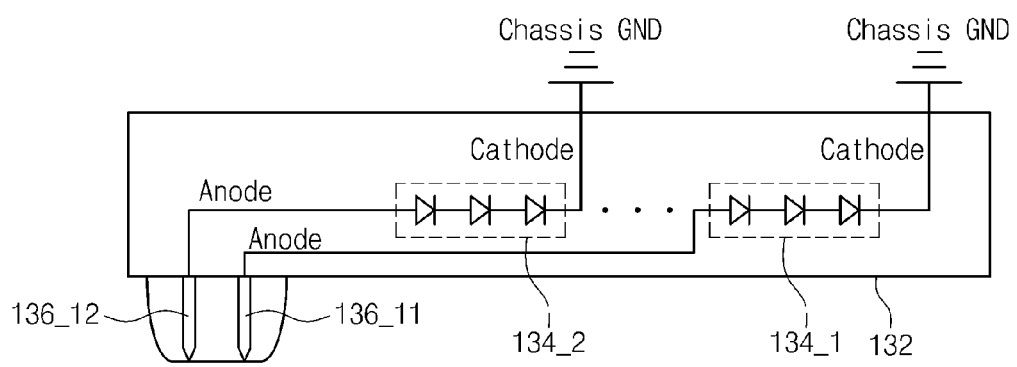
FIG. 9 is a diagram schematically illustrating an LED bar according to an embodiment of the inventive concept.

FIG. 9 is a diagram schematically illustrating an LED bar according to an embodiment of the inventive concept. Referring to FIG. 9, an LED bar 130_4 includes two LED strings 134_1 and 134_2 formed on an LED bar printed circuit board 132. The two LED strings 134_1 and 134_2 are grounded by the bottom chassis. In FIG. 9, two LED strings 134_1 and 134_2 are illustrated. However, the embodiments of the inventive concept are not limited thereto. For example, according to an embodiment, the LED bar 130_2 includes at least two LED strings. For purposes of illustration, the LED bar 130_4 includes two LED strings.

The LED bar printed circuit board 132 includes first and second wires 136_11 and 136_12. The first wire 136_11 is connected to an anode of the first LED string 134_1, and the second wire 136_12 is connected to an anode of the second LED string 134_2.

As compared with an LED bar as illustrated in FIG. 8, the LED bar 130_4 is implemented such that the number of wires is two at the LED bar printed circuit board 132 connected with a socket 124 as illustrated in FIG. 1.

As illustrated in FIGS. 8 and 9, an LED bar having a cathode grounded by the bottom chassis enables the number of wires of an LED bar to be reduced as compared with the number of wires of an LED bar having a cathode which is not grounded by the bottom chassis.

A display device as illustrated in FIG. 1 includes one LED bar 130. However, the embodiments of the inventive concept are not limited thereto. A display device according to an embodiment of the inventive concept can include at least two LED bars connected by a socket shape.

A display device according to an embodiment of the inventive concept can include an LED bar which is disposed at a corner to reduce the number of LEDs.

Figure 10:
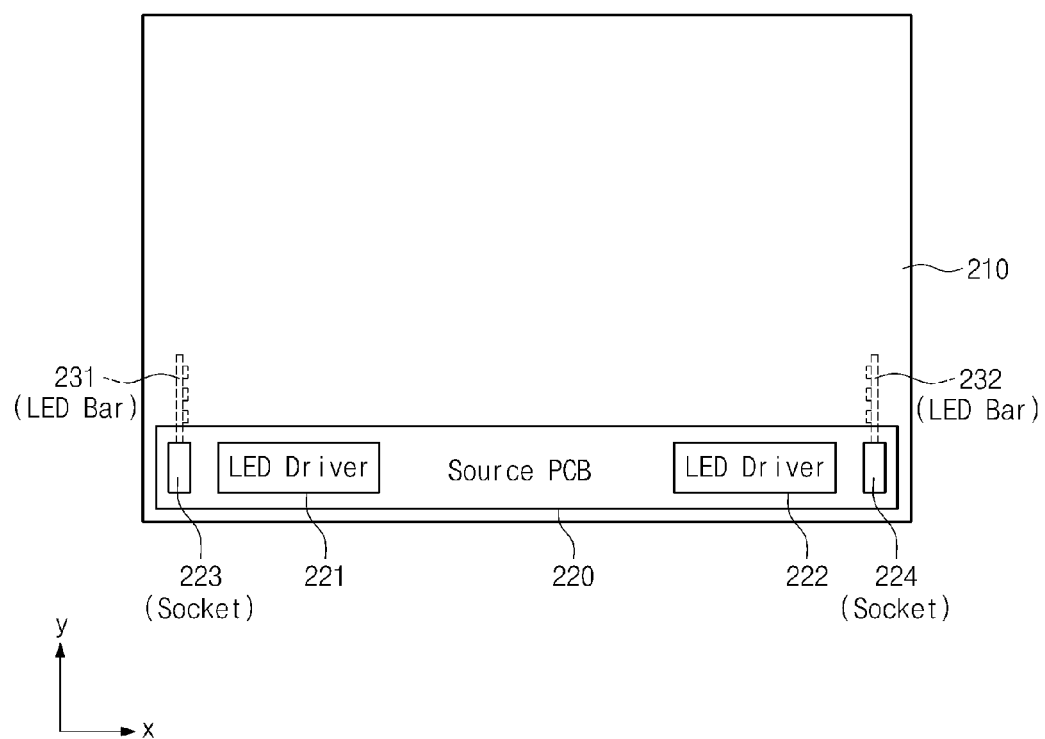
FIG. 10 is a diagram schematically illustrating a display device according to an embodiment of the inventive concept.

FIG. 10 is a diagram schematically illustrating a display device according to an embodiment of the inventive concept. Referring to FIG. 10, a display device 200 includes a bottom chassis 210, a source printed circuit board 220, first and second LED driver circuits 221 and 222, first and second sockets 223 and 224, and first and second LED bars 231 and 232.

The first and second LED driver circuits 221 and 222 are disposed at corners of the source printed circuit board 220, and the first and second sockets 223 and 224 are disposed to correspond to the first and second LED driver circuits 221 and 222, respectively.

The first and second LED bars 231 and 232 are connected to the first and second sockets 223 and 224, respectively. Connections between the first and second LED bars 231 and 232 and the first and second sockets 223 and 224 are made as described in relation to FIGS. 1 to 9.

Figure 11:
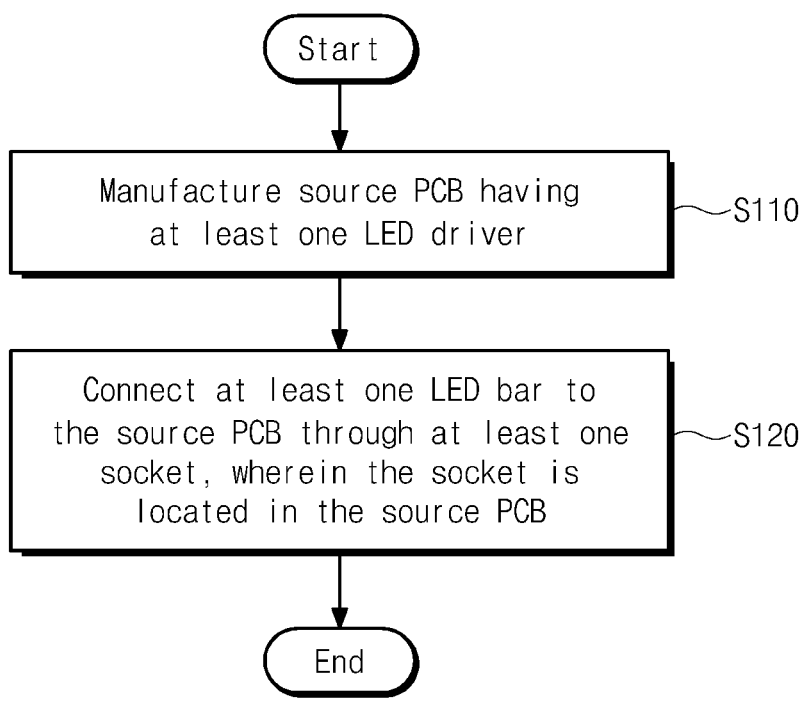
FIG. 11 is a flowchart for describing an LED bar connecting method of a display device according to an embodiment of the inventive concept.

FIG. 11 is a flowchart for describing an LED bar connecting method of a display device according to an embodiment of the inventive concept. For ease of description, an LED bar connecting method will be described with reference to FIGS. 1 through 9 and 11.

An LED bar connecting method comprises fabricating a source printed circuit board 120 having at least one LED driver circuit 122 (S110) and connecting at least one LED bar 130 to the source printed circuit board 120 via at least one socket 124 which is included in the source printed circuit board 120 for connection with at least one LED bar 130. The at least one LED bar 130 is electrically connected to the at least one LED driver circuit 122.

According to the embodiments, it is possible to simplify assembly of a display device and to reduce man-hour consumed for assembly of the display device by connecting an LED bar 130 to a source printed circuit board 120 via at least one socket 124.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A display device comprising:
   a display panel;
   a light emitting diode bar;
   a source printed circuit board including a light emitting diode driver circuit;
   a socket disposed at the source printed circuit board; and
   a bottom chassis accommodating the light emitting diode bar, the bottom chassis having an open portion,
   wherein the socket is inserted in the open portion, and the light emitting diode bar and the light emitting diode driver circuit are connected to each other via the socket.

2. The display device of claim 1, wherein the display panel and the source printed circuit board are electrically connected to each other via a flexible circuit board.

3. The display device of claim 1,
   wherein the bottom chassis fixes a connection between the light emitting diode bar and the light emitting diode driver circuit.

4. The display device of claim 1, wherein the socket includes a protruding portion penetrating the source printed circuit board.

5. The display device of claim 1, wherein the light emitting diode bar comprises:
   a light emitting diode printed circuit board having a connection portion connected with the socket through the open portion; and
   at least one light emitting diode string on the light emitting diode bar.

6. The display device of claim 5, wherein the connection portion has a curve shape.

7. The display device of claim 5, wherein the light emitting diode printed circuit board has a first wire connected with an anode of the light emitting diode string and a second wire connected with a cathode of the light emitting diode string.

8. The display device of claim 5, wherein the light emitting diode bar has at least two light emitting diode strings, and the light emitting diode printed circuit board has a first wire connected with anodes of the light emitting diode strings and second wires respectively connected with cathodes of the light emitting diode strings.

9. The display device of claim 5, wherein the light emitting diode printed circuit board has a first wire connected with an anode of the light emitting diode string, and a cathode of the light emitting diode string is grounded via the bottom chassis.

10. The display device of claim 5, wherein the light emitting diode bar has at least two light emitting diode strings, the light emitting diode printed circuit board has first wires respectively connected with anodes of the light emitting diode strings, and cathodes of the light emitting diode strings are grounded via the bottom chassis.

11. The display device of claim 1, wherein the open portion of the bottom chassis is sealed when the light emitting diode bar is connected to the socket.

12. The display device of claim 1, further comprising:
   a heat sink connected with a backside of the light emitting diode bar.

13. The display device of claim 1, further comprising:
   a light guide plate at a side of the light emitting diode bar; and
   a top chassis surrounding the display panel and connected with the bottom chassis.

14. A display device comprising:
a display panel;
first and second light emitting diode bars;
a source printed circuit board including first and second light emitting diode driver circuits;
first and second sockets disposed at the source printed circuit board; and
a bottom chassis accommodating the first and second light emitting diode bars, the bottom chassis having first and second open portions,
wherein the first socket is inserted in the first open portion and the second socket is inserted in the second open portion,
wherein the first and second light emitting diode bars are respectively connected with the first and second light emitting diode driver circuits via the first and second sockets.

15. The display device of claim 14, wherein the first and second light emitting diode bars are opposite to each other and are disposed at corners of the source printed circuit board.

16. The display device of claim 15, wherein the first and second sockets are adjacent to the first and second light emitting diode driver circuits, respectively.

17. The display device of claim 14, further comprising:
a top chassis surrounding the display panel,
wherein the bottom chassis is connected to the top chassis, wherein the bottom chassis accommodates the first and second light emitting diode bars and fixes connections between the first and second sockets and the first and second light emitting diode bars.

18. The display device of claim 17, wherein each of the first and second sockets comprises first and second protrusions, wherein the first and second protrusions of the first socket are connected to the first light emitting diode bar at the first open portion of the bottom chassis,
wherein the first and second protrusions of the second socket are connected to the second light emitting diode bar at the second open portion of the bottom chassis,
wherein the first protrusion of the first socket is fixed at a side portion of the first open portion and the second protrusion of the first socket is fixed at another side portion of the first open portion,
wherein the first protrusion of the second socket is fixed at a side portion of the second open portion and the second protrusion of the second socket is fixed at another side portion of the second open portion,
wherein the first light emitting diode bar is connected to the first socket between the first and second protrusions of the first socket, and
wherein the second light emitting diode bar connected to the second socket between the first and second protrusions of the second socket.

19. The display device of claim 18, wherein each of the first and second light emitting diode bars includes a cathode grounded by the bottom chassis.

20. A light emitting diode bar connecting method of a display device, comprising:
fabricating at least one light emitting diode driver circuit, a socket connected with the light emitting diode driver circuit, and a source printed circuit board having a display panel driver circuit; and
connecting the at least one light emitting diode bar to the source printed circuit board via the socket,
wherein the at least one light emitting diode bar includes a cathode grounded by a chassis of the display device.

21. A display device comprising:
a bar including a connection part and at least one light source on the bar; and
a source printed circuit board including a socket and a light source driving circuit, wherein the connection part of the bar is connected to the socket of the source printed circuit board so that the light source driving circuit is electrically connected to the light source, and
wherein the light source includes a cathode grounded by a chassis of the display device.

\* \* \* \* \*